US009025604B2

(12) United States Patent
Zhang

(10) Patent No.: US 9,025,604 B2
(45) Date of Patent: *May 5, 2015

(54) SCALING IPV4 AT LARGE DATACENTERS WITH DEVICE LEVEL AGGREGATION

(75) Inventor: Ming Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/347,187

(22) Filed: Jan. 10, 2012

(65) Prior Publication Data

US 2013/0177019 A1    Jul. 11, 2013

(51) Int. Cl.
*H04L 12/28*     (2006.01)
*H04L 12/56*     (2006.01)
*H04L 12/741*    (2013.01)
*H04L 12/713*    (2013.01)
*H04L 12/891*    (2013.01)
*H04J 3/26*      (2006.01)
*H04J 3/16*      (2006.01)
*H04J 3/22*      (2006.01)
*H04L 12/743*    (2013.01)

(52) U.S. Cl.
CPC ........... *H04L 47/41* (2013.01); *H04L 45/54* (2013.01); *H04L 45/586* (2013.01); *H04L 45/7457* (2013.01); *Y02B 60/33* (2013.01)

(58) Field of Classification Search
CPC .. H04L 45/741; H04L 45/7547; H04L 45/748
USPC .................. 370/392, 393, 394, 432, 471
See application file for complete search history.

(56) References Cited

U.S. PATENT DOCUMENTS

| 5,774,668 | A  | * | 6/1998  | Choquier et al. | 709/223 |
| 7,986,696 | B1 | * | 7/2011  | Miliavisky et al. | 370/392 |
| 2001/0040895 | A1 | * | 11/2001 | Templin | 370/466 |
| 2004/0264380 | A1 | * | 12/2004 | Kalkunte et al. | 370/238 |
| 2006/0271682 | A1 | * | 11/2006 | Choo et al. | 709/226 |
| 2013/0010642 | A1 | * | 1/2013  | Ullas et al. | 370/254 |
| 2013/0077530 | A1 | * | 3/2013  | Zhang et al. | 370/255 |
| 2013/0091269 | A1 | * | 4/2013  | Zhang et al. | 709/224 |

* cited by examiner

*Primary Examiner* — Xavier Szewai Wong
(74) *Attorney, Agent, or Firm* — Meunier Carlin & Curfman, LLC

(57) ABSTRACT

Systems and methods are provided to support a large number of hosts while keeping the size of the FIB CAM low. Higher scalability may be achieved by consuming less FIB CAM space as hosts are added to a network. An L3 switching module may be provided capable of supporting a large number of virtual machines and/or hosts while maintaining a small FIB CAM size on a multiple device virtual switching system with device level aggregation.

20 Claims, 4 Drawing Sheets

SCALING IPV4 AT LARGE DATACENTERS WITH DEVICE LEVEL AGGREGATION

BACKGROUND

As Virtual Machines (VM) are introduced into Campus and Data Center networks, the number of hosts connected by switching systems at datacenter grows dramatically. The number could be hundreds of thousands or even millions. Traditional three-tier network architecture can no longer meet the requirements at these types of datacenter network because as number of VMs grows, more switches and routers have to be added. Such grown would cause dramatic increase on latency, complexity and cost.

The latest switching systems developed for such types of Data Center networks are designed with a flatten architecture that consist of multiple L2/L3 switching devices (SD). These SDs are linked together directly (e.g., by full-mess or cascade architecture) or through a switching fabric device (SFD) (e.g., a hub-spoke architecture) to form a virtual switch. All these devices are controlled by a central controller. Routing protocols run on the central controller as a single routing entity. All traffic goes through this system as if switching through a single L2/L3 device. In such a switching system, a packet forwarded cross SDs goes through two stages of hardware lookup/forwarding, where one stage is at the ingress SD and another stage is at the egress SD.

With traditional implementations, the size of a Forwarding Information Base Content Addressable Memory (FIB CAM) table and a next-hop table (e.g., an ADJ table) increase as the number of directly connected hosts increase. This is because for every such a host, one FIB entry and one next-hop entry are required assuming there is at least another directly connected host communicates with that host. However, to increase FIB CAM and next-hop table size would significantly increase cost considering the number of switch devices involved in a large switching system. Because customers seek inexpensive, low-power and low-latency switches, such an architecture does not provide support for a large number of hosts without increasing FIB CAM and next-hop table sizes. This poses a new challenge for switching equipment providers. Although subnet prefixes can be used as aggregation means for the double-lookup-forwarding architecture described above, this does not work in configurations in which a Virtual Local Area Network (VLAN) spans across different SDs, because at an ingress SD there is no conclusion on to which egress SD a packet should be forwarded based on subnet prefix associated with the VLAN.

SUMMARY

Systems and methods to support a large number of hosts while keeping the size of the FIB CAM low. Higher scalability may be achieved by consuming less FIB CAM space as hosts are added to a network. An L3 switching module may be provided capable of supporting a large number of virtual machines and/or hosts while maintaining a small FIB CAM size on a multiple device virtual switching system with device level aggregation.

In accordance with some implementations, there is provided a method comprising determining a subnet prefix from an IPv4 address range; determining a device index from the IPv4 address range; determining a device prefix by combining the subnet prefix and the device index; installing the device prefix in a FIB CAM; receiving an IPv4 packet from a first virtual machine or host addressed to a second virtual machine or host; and performing an ingress lookup that locates the device prefix.

In accordance with some implementations, there is provided a memory and a processor coupled to the memory. The processor is operative to determine a subnet prefix from an IPv4 address range, determine a device index from the IPv4 address range, determine a device prefix by combining the subnet prefix and the device index, and install the device prefix value in FIB CAM tables associated with a plurality of connected switching device.

In accordance with yet other implementations, there is provided a method comprising allocating a first quantity of bits in an IPv4 address for storing a subnet prefix; allocating a second quantity of bits in the IPv4 address for storing a device index; and allocating remaining bits in the IPv4 address for storing a host identifier.

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various implementations. Like reference numerals are used to reference like elements throughout. In the drawings.

DETAILED DESCRIPTION

Figure 1:
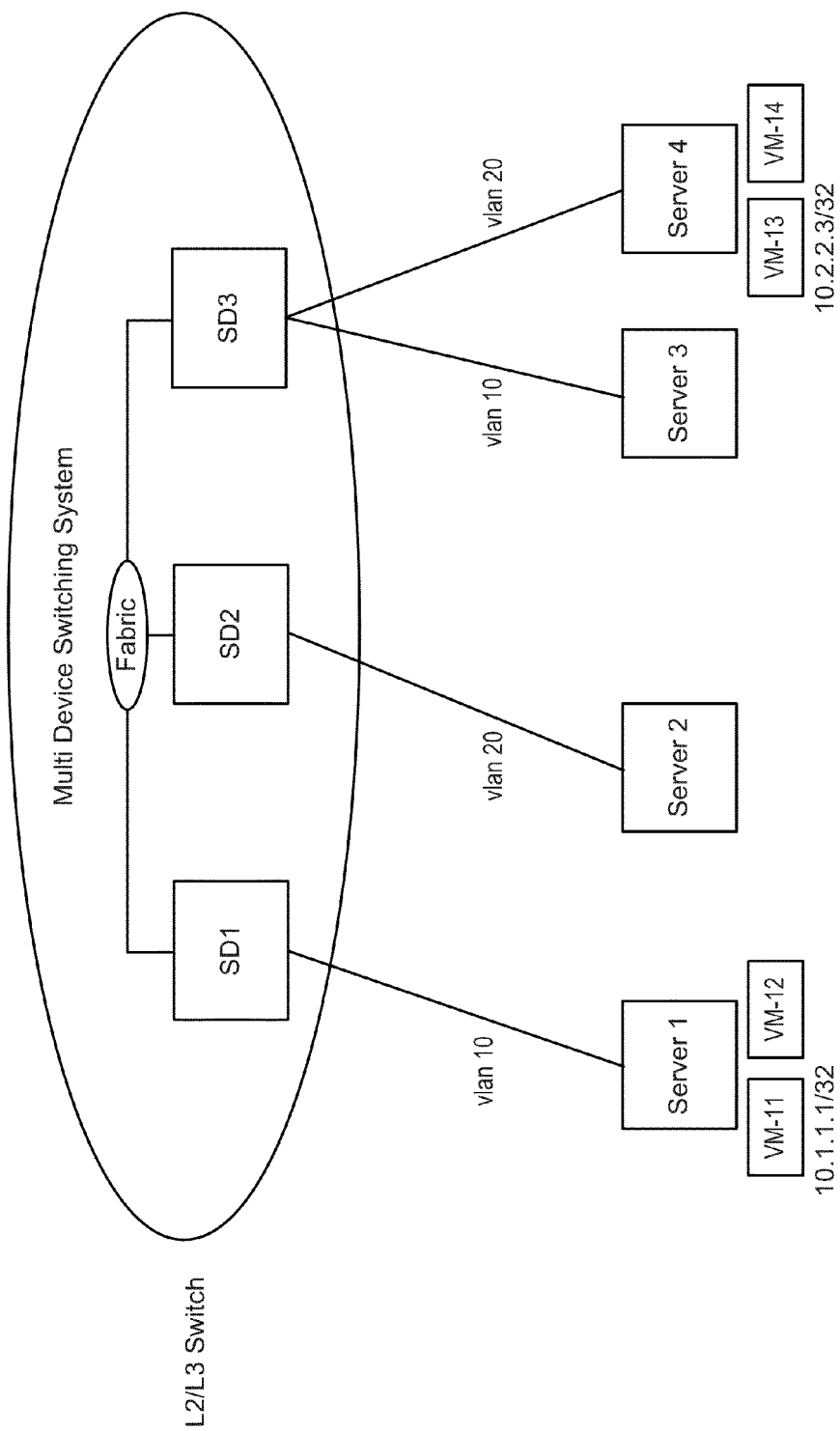
FIG. 1 illustrates an example network environment for embodiments of this disclosure.

Referring now to FIG. 1, there is illustrated an example network environment of embodiments of this disclosure, As shown, there are two VLANs, vlan 10 and vlan 20. The vlan 10 may be assigned with subnet prefix 10.1.0.0/16, where the vlan 20 may be assigned with subnet prefix 10.2.0.0/16. A device prefix 10.2.2.0/24 is configured on switching device 3 (SD3) connecting to virtual machine 13 (VM-13) and virtual machine 14 (VM-14), as described below. An address range 10.2.2.0/24 is installed in FIB CAM on switching device 1 (SD1) and switching device 2 (SD2).

The present disclosure introduces an IPv4 L3 switching module that can support large number of VMs/hosts with very small FIB CAM and next-hop table size on multiple device virtual switching system by device level aggregation. For example, the switching module may be a single chip implementation that provides a limited memory space for the FIB CAM and next-hop tables. As such, supporting a large number of hosts can be difficult. Note for clarity, the present disclosure focuses on the FIB CAM utilization. The next-hop table savings can be calculated with similar method, as described below.

By convention, IPv4 unicast addresses has been classified as public addresses or private addresses. Public addresses are used for accessing public network, e.g., the Internet. Here, uniqueness is mandatory. Private addresses are used within private networks and are kept local and not advertised to public Internet so a same private address can be used at many different private networks. As public addresses are becoming exhausted, techniques have been developed, such as Network Address Translation (NAT), Virtual Private Network (VPN), and LISP, that allow public addresses be used at private networks because these techniques perform a conversion from addresses that are used locally to addresses that are used in a public network at an Internet gateway and vice versa. At a data center, all directly connected hosts can either use private addresses or public addresses if NAT or LISP is deployed at Internet gateway.

RFC 1918 defines IPv4 Private Address Space as being one of three blocks of addresses, which are reserved in accordance with the RFC:

10.0.0.0-10.255.255.255 (10/8 prefix)
172.16.0.0-172.31.255.255 (172.16/12 prefix)
192.168.0.0-192.168.255.255 (192.168/16 prefix)

In accordance with the present disclosure, the first Private Address block (10.0.0.0 to 10.255.255.255) may be used to assign 16,777,216 addresses to hosts within a campus or data center network.

Figure 2:
FIG. 2 illustrates an IPv4 address format according to implementations of the present disclosure.

FIG. 2 illustrates an IPv4 address format according to implementations of the present disclosure. With reference to FIG. 2, N bits in a private IPv4 address are allocated for a Device Index to form Device Prefix. The Device Prefix is formed by combining Subnet Prefix and Device Index. The size of M and N bits may be determined based on number of devices, number of subnets, and number of hosts per VLAN device required in a particular campus or data center network.

This present disclosure is based on configuration that a layer 3 virtual interface consists of multiple layer 2 switch ports, all of which share a same VLAN ID. A layer 2 switch port can connect to multiple hosts or VMs. The Device Prefix is provisioned on a switch device, where there is one Device Prefix per VLAN (i.e., the Device Prefix matches a subnet). A Device Prefix associated with a VLAN interface on the device may be summarized by Subnet Prefix on the VLAN interface. All addresses assigned to hosts connected to the VLAN on the device are summarized by the same Device Prefix configured on the VLAN of the device.

When Layer 2 ports of a VLAN are spread across multiple SDs, a subnet prefix aggregation scheme does not work for optimal forwarding because no conclusion can be made about to which egress device a packet should be forwarded. However, in accordance with the present disclosure, forwarding across multiple SDs is possible because the Device Prefix is associated with only one egress device. For example, the Device Prefix may be installed in FIB CAM tables on all SDs except for the local SD. A destination device index may be installed as destination index for the Device Prefix. These Device Prefix FIB entries are used for Ingress lookup-forwarding. On the egress SD, only local host entries are installed in FIB CAM table on the local SD. The host FIB entries are used for Egress lookup-forwarding. If both a source and a destination are on the same SD, host FIB entries are used for FIB lookup as only one FIB lookup is required. Subnet prefixes are installed on the local SD such that ARP packets are sent to a central controller CPU for processing.

Assigning Subnet Prefixes, Device Prefixes and Host Addresses can be achieved through a DHCP server and other network management tools. Subnet Prefixes, Device Prefixes and Host Addresses may be configured following the rules set forth herein.

Device Index

In order to provide for a large number of devices, e.g. where there is more than 1000 devices, a Device Index to Device ID Mapping may be maintained. The Device ID Mapping Table may be maintained on a, e.g., central controller. For example, to support 1000 devices, 10 bits are required. Similarly, to support 4000 devices, 12 bits are required. However, because IPv4 private addresses allow for only 24 bits, the number of bits available is limited. Each VLAN may contain a relatively few number of devices, e.g., each VLAN may have 10 devices, which limits the number of bits necessary for each VLAN to 4 or 4 bits per VLAN.

To deploy a large system with thousands of devices, e.g., 1000 to 4000 devices, 10 to 12 bits may be used from IPv4 address to represent Device IDs. However, a VLAN may span across a few, but not all SDs, in a switching system and there is upper bound (K) on the number of SDs a VLAN can span across. As such, Device Indexes may be used to represent devices a VLAN spans. The number of bits for Device Index can be calculated as N Bites=Log 2 (K)

If K=16, then N bites=4; if K=32, then N bites=5; if K=64, then N bites=6; and so on.

For private IPv4 address 10.x.x.x, there are 24 bits for subnet X (excluding the first 8 bits), Device Index (DI) and Host ID. If 8 bits are used for Host Id, then the follow applies:

| Subnet X bits | DI bits | No of Subnets | No of Devices/Subnet |
| --- | --- | --- | --- |
| 12 | 4 | 4096 | 16 |
| 11 | 5 | 2048 | 32 |
| 10 | 6 | 1024 | 64 |

It is noted that a public address may be used, so long as the address is contained within a local, private network by isolation techniques. The number of bits used for the Host Id may be determined based on the network design.

The above would satisfy configurations at most large datacenters. However, for datacenters that require larger number of subnets but less number of hosts per VLAN on a device, the following may be used:

| Host ID bits | Subnet X bits | DI bits | No of Subnets | No of Devices/Subnet |
| --- | --- | --- | --- | --- |
| 6 | 14 | 4 | 16,384 | 16 |
| 5 | 15 | 4 | 32,768 | 16 |
| 4 | 16 | 4 | 65,536 | 16 |

Thus, in view of the above, with reference to FIG. 1, if an IPv4 packet comes from VM-11 having an address 10.1.1.1 destined for VM-13 having an address 10.2.2.3, the pack first arrives at SD1. A Layer 3 Ingress lookup in hardware results in the device prefix 10.2.2.0/24, with a destination index pointed to SD3. Without a Layer 2 rewrite, the frame is forwarded to egress SD3 (assuming the MAC of the destined host has been discovered). A Layer 3 egress lookup returns the destination FIB CAM entry 10.2.2.3 for VM-13, and the packet is forwarded to VM-13. Reverse traffic may be forwarded the same way with a Device Prefix provisioned on SD1 and corresponding FIB CAM entry installed on SD2 and SD3. As used herein, the above is defined as "two-stage forwarding." One-stage forwarded is where all forwarding is determined by the ingress lookup.

The device ID mapping table consists of all Device Prefixes in a switching system. For each Device Prefix, the device ID mapping table maintains a Device Index to Device ID mapping. This mapping table may be downloaded to CPU of all switch devices. On a switch device, the Device ID can be derived from Device Prefix and Device Index in the mapping table. A Device ID is associated to a Destination Index in hardware. The Device Prefix is programmed in FIB table and Destination Index is programmed in Nest-hop/Rewrite Table in Hardware. When a packet arrives at an ingress device, a FIB lookup matches the Device Prefix that gives an Next-hop pointer. At a Rewrite stage of the pipeline, the Destination Index is used for forwarding packet to the egress device. At the egress device, FIB lookup matches Host entry (assuming link-layer address has been resolved) and packet is forwarded to its destination.

To simplify management, an implementation can organize devices into Device Groups (DG). In such implementation, A VLAN cannot span beyond a DG. One simple Device Index to Device ID mapping in a DG can be used for all device prefixes associated to that DG. DI bits can be calculated from number of SDs in the DG.

To calculate the Maximum Number of Hosts can be supported, the following relationship may be established:

H=V×R×S
H—Max number of hosts
R—Number of hosts per VLAN on a SD
V—Average Vlans/SD
S—Number of SDs After finding H, the number of subnets may be calculated and FIB CAM entries required and verify that they are within the range of total subnets supported by the system and CAM table size supported by SD.

E=S/L×V
C=V×(S+R)
E—Number of subnets
C—FIB CAM entries required
L—Max number of SDs a VLAN can spans After computing E, the number of subnet X bits can be determined.

EXAMPLES

Example 1

Assume 100 SDs, 40 Vlan/Device, 250 hosts per VLAN on a SD, and 16 SDs a VLAN can span, 1 million (H=40×250×100) hosts can be supported. For this example, 280 subnets are required (E=100/16×40). That leaves 9 bits for subnet X bits. As such, only 14,000 FIB CAM space (C=40×(100+250)) is required. The total number of bits is 9+4+8=21. That is less than 24 bits usable in the private IPv4 address space. Note that the 3 bits remaining may be distributed to any or all of the 3 fields in private IPv4 address for future growth. For example, because V is the average VLANs per device, the 3 bits remaining may be used for N to make it to be 7 bits long. As such, some VLANs can span across more SDs.

Example 2

Assume 200 SDs, 200 Vlan/Device, 50 hosts per VLAN on a SD, and 16 SDs a VLAN can span, 2 million (H=200×50×200) hosts can be supported. Here, 1400 subnets are required (E=200/16×200). That leaves 11 bits for subnet X bits. As such, only 50,000 FIB CAM space (C=200×(200+50)) is required. The Total number of bits is 11+4+6=21. As such, less than 24 bits usable in the IPv4 private address space.

As such, the above examples show the scalability of using private IPv4 addresses (24 usable bits). If public IPv4 addresses (32 usable bits) are used, many more subnet prefixes and host addresses can be assigned, so scalability is much higher.

The description above describes operations with VLAN configuration. Operations on other types of network configurations are possible. For example, on a pure layer-3 interface, the subnet prefix may be configured on the interface with destination Device index on all other SDs. When a packet arrived at an ingress SD, the subnet prefix will be returned and the packet forwarded to the egress SD to reach its destination. On an Ether-channel (LAG) interface, the subnet prefix may be installed with Ether-channel destination index on all SDs. A packet arriving at an ingress SD results in the subnet prefix, and is forwarded to a SD depending on Ether-channel load-balancing computation result. Then packet is forwarded by the egress SD based on an egress lookup.

Figure 3:
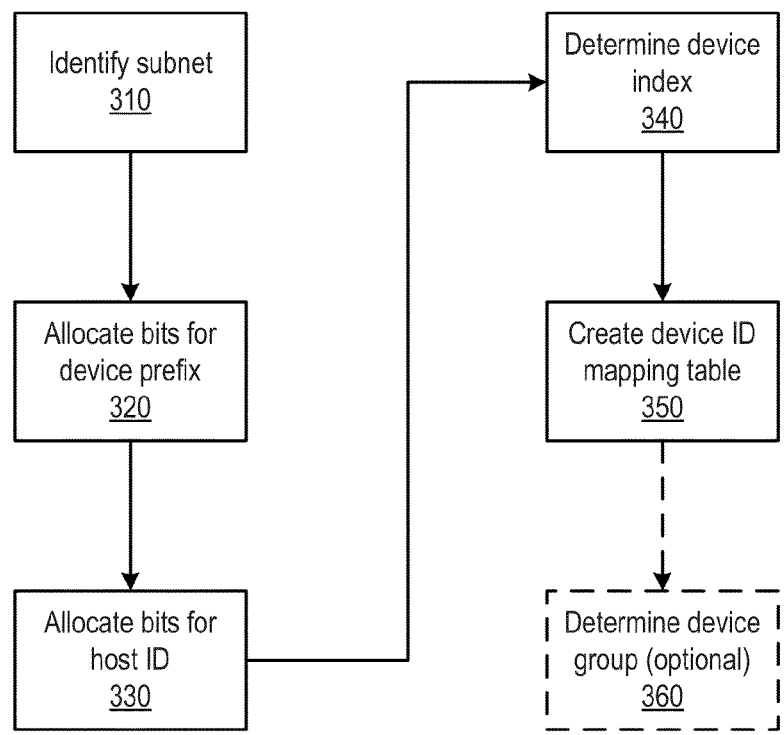
FIG. 3 is an operational flow chart illustrating implementations of this disclosure.

FIG. 3 is an operational flow chart illustrating implementations of the present disclosure. The flow may begin at 310 where a subnet of M bits is identified. For example, the 10.X.0.0 subnet may be utilized, providing an M bit address space. At 320, a first quantity of N bits in an IPv4 address may be allocated for storing a device prefix. The N bits are reserved from the subnet having M bits of address space. At 330, a second quantity of bits in the IPv4 address may be allocated as a Host ID. The second quantity may, thus be 32-N-M bits. In some implementations, two or more of the plurality of switching devices may share a same VLAN identification. Furthermore, at least one of the switching devices may be connected to one or more virtual machines and/or hosts. At 340, a device index is determined. The device index represents devices a VLAN spans. In some embodiments, all assigned host addresses associated with the switch device may be summarized by the device prefix. At 350, a device index to device ID mapping table is created. The device ID mapping table is downloaded to the CPU of all switch devices. Optionally, 360, a device group may be determined. The device group may be used to organize devices where a particular VLAN spans within the device group.

Figure 4:
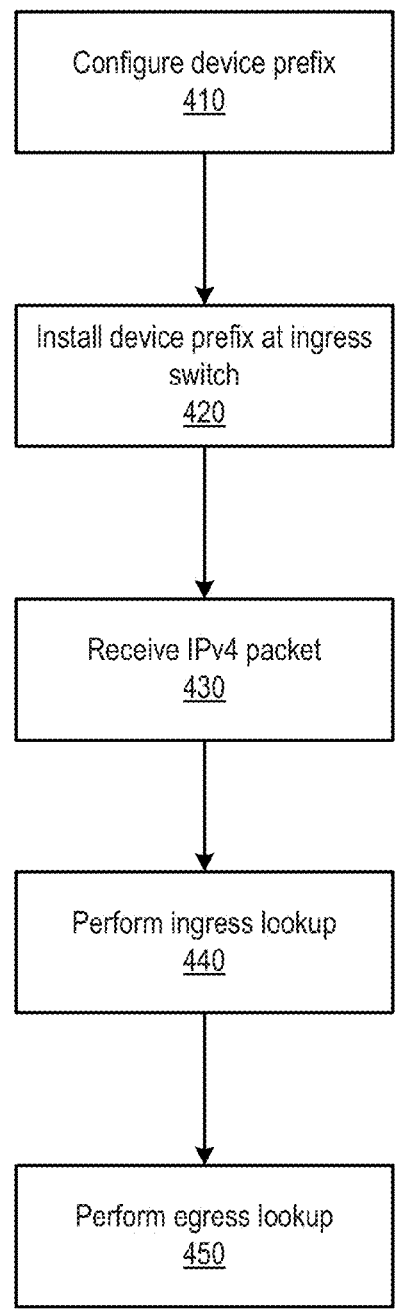
FIG. 4 is an operational flow chart illustrating further implementations of this disclosure.

FIG. 4 is an operational flow chart illustrating implementations of the present disclosure. The flow 400 may begin at 410, where one of: a device prefix is configured. The device prefix is determined based on IPv4 address information as described above. In some implementations, the configuration may take place on a switching device. The switching device may reside on a path between the first virtual machine and the second virtual machine. At 420, the device prefix may be installed in a FIB CAM at the ingress switching device. In some implementations, the prefix may comprise a destination index pointing to an egress switch device. At 430, an IPv4 packet may be received from a first virtual machine addressed to a second virtual machine. At 440, an ingress lookup may be performed at an ingress SD. The ingress lookup may locate the designated prefix and forward the IPv4 packet to an egress SD. In some implementations, at 450, an egress lookup may be performed as the packet traverses to its destination. The egress lookup may be performed at the egress DS to locate a destination entry on the FIB CAM corresponding to the second virtual machine.

An embodiment consistent with this disclosure may comprise an apparatus for scaling IPv4 on multiple devices. The system may comprise a processor coupled to a memory, wherein the processor is operative to determine a device prefix value based on IPv4 address information. The processor may be further configured to install the device prefix value in FIB CAM tables associated with a plurality of connected switching devices.

The processor may further be configured to use the device prefix value for ingress lookup. In some embodiments, the apparatus may be a switching device. The switching device may reside on the same VLAN as the plurality of connected switching devices. The processor may be further configured to punt an entry data packet to a central controller for processing.

This present disclosure, thus resolves a critical IPv4 Layer 3 scalability issue that cannot be achieved with traditional Layer 3 forwarding model on multiple switch devices system when VLAN spans across multiple devices. With this innovation, multi-millions of hosts can be supported with small FIB CAM and Next-hop table sizes while maintaining optimal (one hop) forwarding from any directly connected hosts to any other directly connected hosts.

Figure 5:
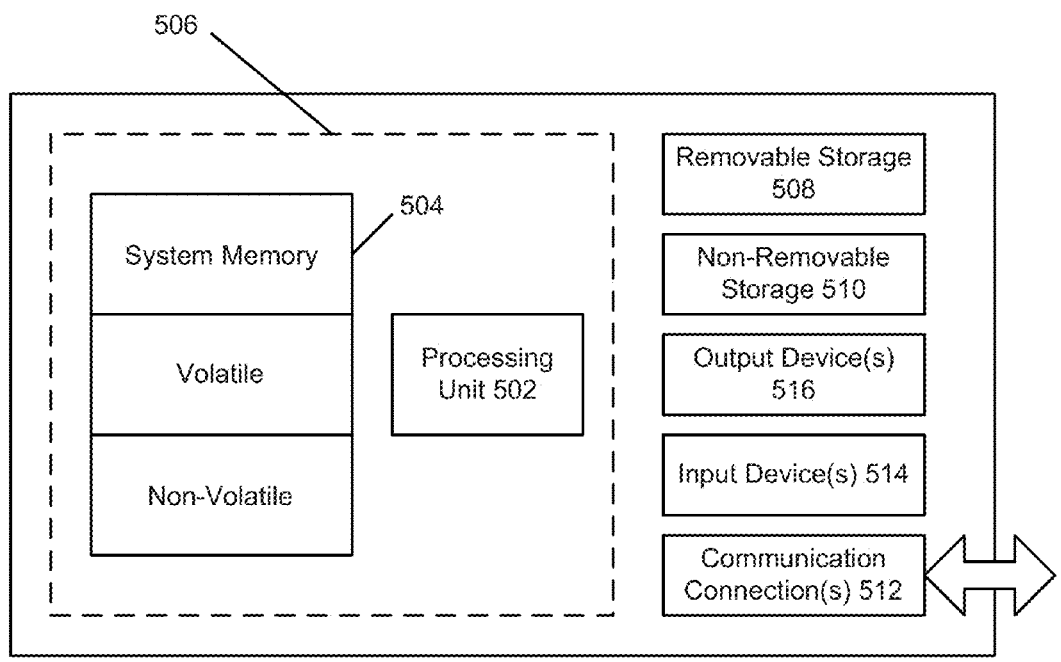
FIG. 5 is a block diagram of a computing device.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   determining, at a switching device within a network, a subnet prefix from an Internet Protocol version 4 (IPv4) address range;
   determining a device index from the IPv4 address range;
   determining a device prefix by combining the subnet prefix and the device index;
   installing the device prefix in a Forwarding Information Base Content Addressable Memory (FIB CAM);
   receiving an IPv4 packet from a first virtual machine or host addressed to a second virtual machine or host; and
   performing an ingress lookup that locates the device prefix.

2. The method of claim 1, wherein configuration of the device prefix occurs on a switching device.

3. The method of claim 2, wherein the switching device resides on a path between the first virtual machine or host and the second virtual machine or host.

4. The method of claim 1, further comprising maintaining a device index to device mapping, wherein the device index to device mapping is maintained on a central controller, and wherein the device index to the device mapping consists of all device prefixes in a switching system.

5. The method of claim 1, further comprising performing an egress lookup, which locates a destination entry on the FIB CAM corresponding to the second virtual machine or host.

6. The method of claim 5, further comprising forwarding the packet to the egress switching device.

7. The method of claim 1, wherein the method is performed on a layer 3 (L3) interface without Virtual Local Area Network (VLAN) association.

8. An apparatus comprising:
a memory; and
a processor coupled to the memory, wherein the processor is operative to:
determine a subnet prefix from an Internet Protocol version 4 (IPv4) address range;
determine a device index from the IPv4 address range;
determine a device prefix by combining the subnet prefix and the device index; and
install the device prefix value in Forwarding Information Base Content Addressable Memory (FIB CAM) tables associated with a plurality of connected switching devices.

9. The apparatus of claim 8, wherein the processor is further configured to use the device prefix value for ingress lookup.

10. The apparatus of claim 9, wherein the apparatus is a switching device with a plurality of ports.

11. The apparatus of claim 8, wherein the processor is further configured to maintain a device index to device mapping that consists of all device prefixes in a switching system.

12. The apparatus of claim 8, wherein the processor is further configured to append a host identifier (ID) to the device prefix.

13. The apparatus of claim 8, wherein the plurality of connected switching devices reside on a same Virtual Local Area Network (VLAN).

14. A method comprising:
allocating a first quantity of bits in an Internet Protocol version 4 (IPv4) address for storing a subnet prefix;
allocating a second quantity of bits in the IPv4 address for storing a device index; and
allocating remaining bits in the IPv4 address for storing a host identifier,
wherein the allocating is performed by a switching device within a network.

15. The method of claim 14, wherein the IPv4 address is appended to a packet transmitted across a Level-3 virtual interface comprised of a plurality of Layer-2 and Layer-3 switching devices.

16. The method of claim 14, further comprising computing a device prefix by combining the subnet prefix and the device index.

17. The method of claim 16, wherein two or more of the plurality of switching devices share a same Virtual Local Area Network (VLAN) identification.

18. The method of claim 17, wherein at least one of the switching devices is connected to one or more virtual machines or hosts.

19. The method of claim 14, further comprising installing the device prefix in Forwarding Information Base Content Addressable Memory (FIB CAM) tables on a plurality of the switching devices, wherein the device prefix consists of the subnet prefix and the device index.

20. The method of claim 19, further comprising summarizing all assigned host addresses by the device prefix.

* * * * *